(12) United States Patent
Nakanishi et al.

(10) Patent No.: US 8,635,463 B2
(45) Date of Patent: Jan. 21, 2014

(54) INFORMATION STORAGE APPARATUS, INFORMATION STORAGE METHOD, AND ELECTRONIC DEVICE

(75) Inventors: Hironori Nakanishi, Oume (JP); Kana Furuhashi, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 35 days.

(21) Appl. No.: 13/216,577

(22) Filed: Aug. 24, 2011

(65) Prior Publication Data

US 2012/0084574 A1 Apr. 5, 2012

(30) Foreign Application Priority Data

Sep. 30, 2010 (JP) ................................ P2010-223217

(51) Int. Cl.
*G06F 12/14* (2006.01)

(52) U.S. Cl.
USPC .......................................... 713/193; 713/189

(58) Field of Classification Search
None
See application file for complete search history.

(56) References Cited

U.S. PATENT DOCUMENTS

| | | | | |
|---|---|---|---|---|
| 4,203,166 A | * | 5/1980 | Ehrsam et al. | 380/45 |
| 4,465,901 A | * | 8/1984 | Best | 713/190 |
| 4,578,530 A | * | 3/1986 | Zeidler | 705/71 |
| 4,997,288 A | * | 3/1991 | Rosenow | 380/2 |
| 5,642,420 A | * | 6/1997 | Kuroda et al. | 380/30 |
| 5,652,796 A | * | 7/1997 | Barraza et al. | 380/29 |
| 5,796,836 A | * | 8/1998 | Markham | 380/28 |
| 6,209,098 B1 | * | 3/2001 | Davis | 713/194 |
| 6,320,964 B1 | * | 11/2001 | Callum | 380/29 |
| 7,203,842 B2 | * | 4/2007 | Kean | 713/189 |
| 7,353,404 B2 | * | 4/2008 | Hashimoto et al. | 713/194 |
| 7,386,717 B2 | * | 6/2008 | Adusumilli | 713/153 |
| 7,925,024 B2 | * | 4/2011 | Patariu et al. | 380/278 |
| 2002/0114453 A1 | * | 8/2002 | Bartholet et al. | 380/44 |
| 2002/0184487 A1 | * | 12/2002 | Badamo et al. | 713/153 |
| 2003/0037247 A1 | * | 2/2003 | Obara et al. | 713/193 |
| 2004/0098579 A1 | * | 5/2004 | Nakano et al. | 713/150 |
| 2005/0185790 A1 | * | 8/2005 | Le Quere | 380/28 |
| 2007/0074046 A1 | * | 3/2007 | Czajkowski et al. | 713/190 |
| 2008/0162354 A1 | * | 7/2008 | Alve et al. | 705/51 |

FOREIGN PATENT DOCUMENTS

| | | |
|---|---|---|
| JP | 09-252294 | 9/1997 |
| JP | 2006-107380 | 4/2006 |
| JP | 2006-173820 | 6/2006 |
| JP | 2006-260491 A | 9/2006 |
| JP | 2010-009306 A | 1/2010 |
| JP | 2010-033319 A | 2/2010 |
| JP | 2010-079445 A | 4/2010 |
| JP | 4463320 B1 | 5/2010 |

OTHER PUBLICATIONS

Translation of Japanese Office Action, Application No. 2010-223217 dated Aug. 30, 2013.

* cited by examiner

*Primary Examiner* — Peter Poltorak
(74) *Attorney, Agent, or Firm* — Patterson & Sheridan, LLP

(57) ABSTRACT

According to one embodiment, there is provided an information storage apparatus, including: a plurality of nonvolatile memories configured to store encryption information so that the stored encryption information are read out therefrom; a plurality of encryption processing modules provided correspondingly with the respective memories, and configured to encrypt the information to be stored in the memories and to decrypt the encryption information read out from the memories; and a storage processing module configured to collectively store a plurality of key information that are utilized when the encryption processing modules encrypt the information to be stored or decrypt the encryption information read out.

8 Claims, 4 Drawing Sheets

FIG. 3

| KEY ID (LBA) | KEY ADDRESS | KEY INFORMATION |
|---|---|---|
| 0 | 0 | KEY INFORMATION A1 |
| 0 | 1 | KEY INFORMATION A2 |
| 0 | 2 | KEY INFORMATION A3 |
| 0 | 3 | KEY INFORMATION A4 |
| 1 | 0 | KEY INFORMATION B1 |
| 1 | 1 | KEY INFORMATION B2 |
| 1 | 2 | KEY INFORMATION B3 |
| 1 | 3 | KEY INFORMATION B4 |
| ... | 0 | ... |
| ... | 1 | ... |
| ... | 2 | ... |
| ... | 3 | ... |
| n | 0 | KEY INFORMATION n1 |
| n | 1 | KEY INFORMATION n2 |
| n | 2 | KEY INFORMATION n3 |
| n | 3 | KEY INFORMATION n4 |

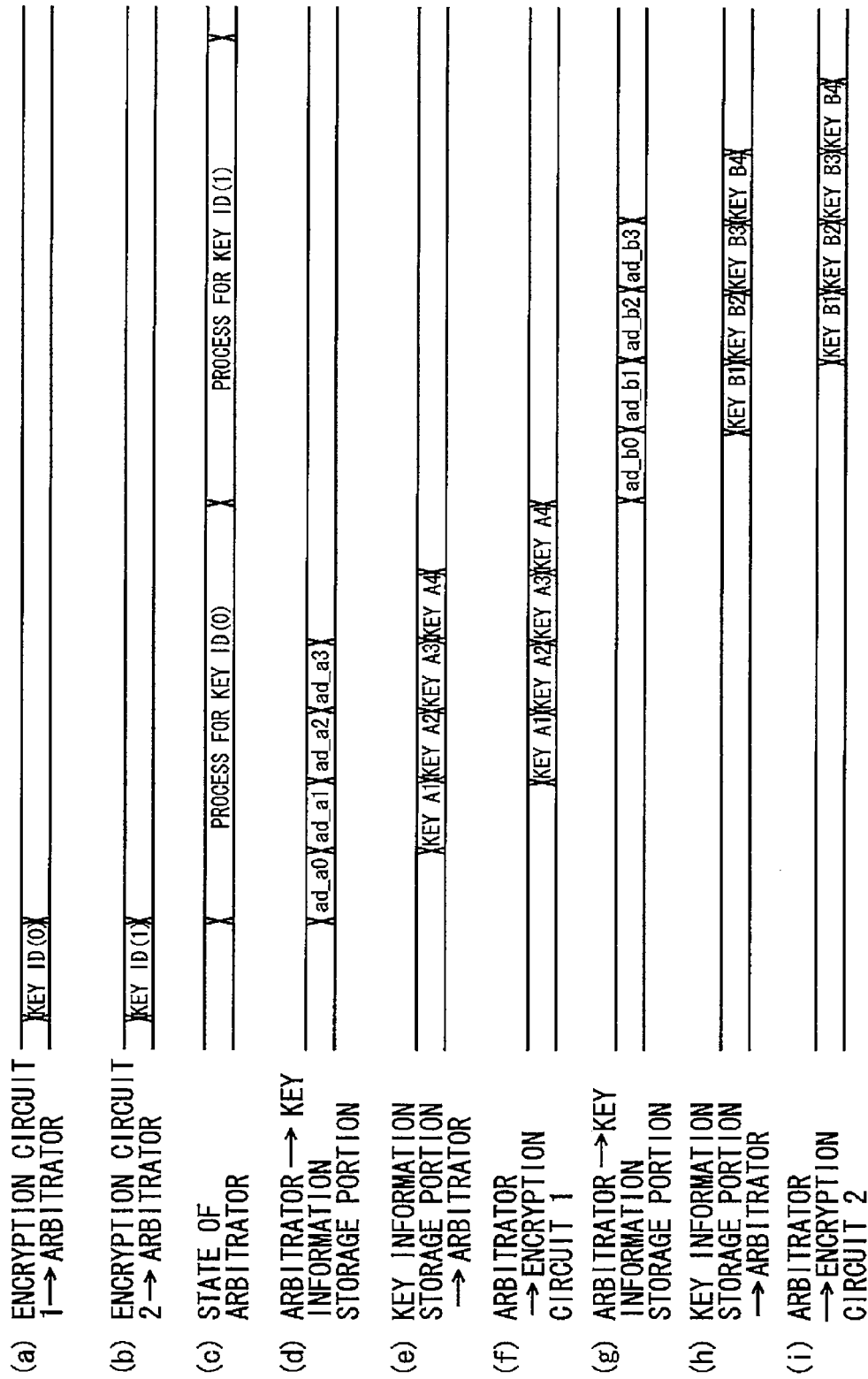

INFORMATION STORAGE APPARATUS, INFORMATION STORAGE METHOD, AND ELECTRONIC DEVICE

CROSS-REFERENCE TO RELATED APPLICATION(S)

This application is based upon and claims the benefit of priority from Japanese Patent Application No. 2010-223217, filed on Sep. 30, 2010, the entire contents of which are incorporated herein by reference.

FIELD

Embodiments described herein relate generally to an information storage apparatus, an information storage method, and an electronic device which store key information for the encryption and decryption of information.

BACKGROUND

In recent years, as a nonvolatile storage medium for storing information, a NAND flash memory is utilized in an information storage apparatus such as an SSD (Solid State Drive). The NAND flash memory is integrated as a semiconductor chip to have a capacity of several tens [Mbytes]. The SSD includes such semiconductor chips in plurality to realize a total capacity of several hundred [Mbytes]. Besides, the write of information into or the erase of information from the NAND flash memory is controlled in units of a predetermined capacity.

In the information storage apparatus, encrypted information is stored in the storage medium, and the encryption information read out from the storage medium is decrypted. Identical key information is utilized in the encryption and decryption of the information, whereby the decryption of the encrypted information is permitted. In the SSD, plural interface ICs for transmitting and receiving information to and from the plural semiconductor chips are included in correspondence with these semiconductor chips being the storage medium. The respective interface ICs concurrently execute the encryptions or decryptions of information for the corresponding semiconductor chips, by utilizing appropriate key information.

That is, in the SSD, the plural key information are sometimes utilized concurrently by the plural interface ICs which execute the encryptions or decryptions of the information. Besides, in an encryption system including plural encryption processing blocks, the plural encryption processing blocks store key information for encryptions and decryptions, respectively and individually.

Thus, even in a case where common key information is utilized for encryption and decryption, plural blocks which execute encryption processing store key information respectively and individually. As a result, the key information for the encryptions and decryptions of information are not stored efficiently.

BRIEF DESCRIPTION OF DRAWINGS

A general architecture that implements the various feature of the present invention will now be described with reference to the drawings. The drawings and the associated descriptions are provided to illustrate embodiments and not to limit the scope of the present invention.

FIG. 3 illustrates examples of the key information which are managed by a management portion.

FIG. 4 illustrates a timing chart in the key information management processing.

DETAILED DESCRIPTION

In general, according to one embodiment, there is provided an information storage apparatus, including: a plurality of nonvolatile memories configured to store encryption information so that the stored encryption information are read out therefrom; a plurality of encryption processing modules provided correspondingly with the respective memories, and configured to encrypt the information to be stored in the memories and to decrypt the encryption information read out from the memories; and a storage processing module configured to collectively store a plurality of key information that are utilized when the encryption processing modules encrypt the information to be stored or decrypt the encryption information read out.

Embodiments will be described with reference to the drawings.

Figure 1:
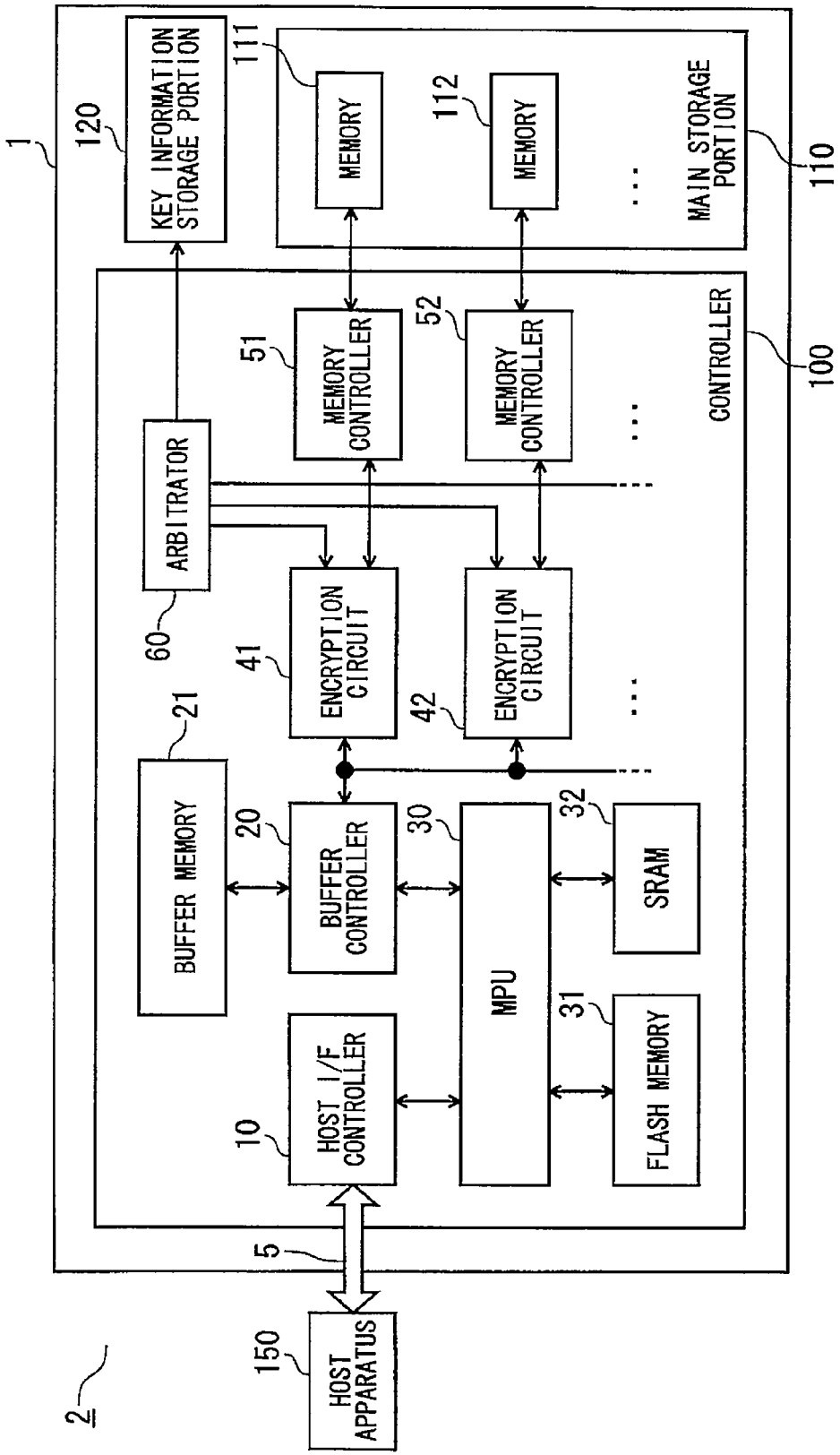
FIG. 1 illustrates an example configuration of an electronic device which includes an SSD as an information storage apparatus according to an embodiment.

FIG. 1 illustrates an example configuration of an electronic device 2. In this embodiment, the electronic device 2 includes an SSD (Solid State Drive) 1 as an information storage apparatus and a host apparatus 150. The SSD 1 is connected with the host apparatus 150 through a communication medium (host I/F) 5, and it functions as the storage module of the host apparatus 150. The host I/F 5 connects the host apparatus 150 and the SSD 1, and it is utilized for communications concerning the transmissions and receptions of data and commands between the host apparatus 150 and the SSD 1. For example, the electronic device 2 is a personal computer, and the host apparatus 150 is a CPU (Central Processing Unit) which is included in the personal computer.

In this embodiment, the SSD 1 includes a semiconductor memory (such as a NAND flash memory) as a nonvolatile storage medium. The SSD 1 stores program information concerning the control of the host apparatus 150, user data, etc., in rewritable fashion. This SSD 1 functions as an SED (Self Encrypting Drive), and it stores the information in a state where the information is encrypted by an encryption scheme such as AES (Advanced Encryption Standard).

The information storage apparatus 1 includes a main storage portion 110 which is configured of a controller 100, and plural memories 111, 112, . . . , and a key information storage portion 120 which is a nonvolatile memory. The controller 100 includes a host I/F controller 10, a buffer controller 20, a buffer memory 21, an MPU 30, a flash memory 31, an SRAM 32, encryption circuits 41, 42, . . . , memory controllers 51, 52, . . . , and an arbitrator 60.

The host I/F controller 10 controls the communications of the SSD 1 with the host apparatus 150 through the host I/F 5. This host I/F controller 10 outputs a command or user data received from the host apparatus 150, to the MPU 30 or the buffer controller 20. Besides, the host I/F controller 10 transmits user data inputted from the buffer controller 20, or a response notification (such as a notification indicating the completion of the execution of a command) from the MPU 30, to the host apparatus 150.

Under the control of the MPU 30, the buffer controller 20 writes user data inputted from the host I/F controller 10, into the buffer memory 21, and it reads out user data to be outputted to the host I/F controller 10, from the buffer memory 21. Besides, under the control of the MPU 30, the buffer controller 20 reads out user data to be outputted to the encryption circuits 41, 42, . . . , from the buffer memory 21, and it writes user data inputted from the encryption circuits 41, 42, . . . , into the buffer memory 21.

The buffer memory 21 temporarily stores the user data to be exchanged between the host I/F controller 10 and the encryption circuits 41, 42, . . . , under the control of the buffer controller 20.

The MPU 30 collectively controls the individual blocks of the SSD 1, and in a case where the host I/F controller 10 receives an instruction from the host apparatus 150, this MPU 30 performs a control conforming to the instruction. For example, the MPU 30 directs in conformity with the instruction from the host apparatus 150, the buffer controller 20, the encryption circuits 41, 42, . . . , and the memory controllers 51, 52, . . . to write user data into the main storage portion 110 and to execute processing necessary for the read-out of user data from the main storage portion 110. Besides, the MPU 30 updates key information to be utilized in the encryption circuits 41, 42, . . . , and it outputs the updated key information to the arbitrator 60.

The flash memory 31 is a nonvolatile storage medium, and it stores programs to be run by the MPU 30, various setting information, etc. in rewritable fashion. The SRAM 32 is a volatile storage medium, it functions as the work area of the MPU 30, and it functions as stacks, buffers, etc. at the times of various processes.

The encryption circuits 41, 42, . . . encrypt the user data inputted from the buffer controller 20, and they output the encrypted user data to the respectively corresponding memory controllers 51, 52, . . . . Besides, the encryption circuits 41, 42, . . . decrypt the encrypted user data inputted from the respectively corresponding memory controllers 51, 52, . . . , and they output the decrypted user data to the buffer controller 20. These encryption circuits 41, 42, . . . generate encryption keys on the basis of the key information obtained by making requests to the arbitrator 60, and they encrypt the user data or decrypt the encrypted user data by using the generated encryption keys. Further, in a case where the key information are updated by the MPU 30, the encryption circuits 41, 42, . . . are notified of the updated key information. Incidentally, the encryption circuits 41, 42, . . . may be configured as a hardware module or a software (program) module.

The memory controllers 51, 52, . . . include FIFO buffers and ECC processors, and they control the transmissions and receptions of information to and from the main storage portion 110 which is configured of, for example, NAND flash memories. These memory controllers 51, 52, . . . transmit and store the encrypted user data inputted from the respectively corresponding encryption circuits 41, 42, . . . , to and in the respectively corresponding memories 111, 112, . . . . Besides, these memory controllers 51, 52, . . . receive the encrypted user data read out from the respectively corresponding memories 111, 112, . . . , and they output the read-out data to the respectively corresponding encryption circuits 41, 42, . . . .

The arbitrator 60 reads out the key information requested by any of the encryption circuits 41, 42, . . . , from the key information storage portion 120, and it outputs the read-out key information to the requesting one of the encryption circuits 41, 42, . . . . Besides, in a case where the key information is by the MPU 30, the arbitrator 60 is notified of the updated key information, and it stores this key information in the key information storage portion 120. Further, the arbitrator 60 manages the key information under predetermined conditions and causes the key information storage portion 120 to store them.

In this embodiment, the controller 100 controls the encryptions and decryptions of the user data between the host apparatus 150 and the main storage portion 110, by utilizing the plural blocks. More specifically, in this embodiment, in the encryptions and decryptions of the user data, the key information which are collectively stored in the key information storage portion 120 are appropriately outputted to the corresponding ones of the encryption circuits 41, 42, . . . by the arbitrator 60.

The key information storage portion 120 is the nonvolatile memory for storing the key information which are utilized in the encryptions and decryptions of the user data executed by the encryption circuits 41, 42, . . . . This key information storage portion 120 may be disposed within the controller 100. Even in this case, the key information storage portion 120 is not divided for the respective encryption circuits 41, 42, . . . , but it is configured so as to collectively store all the key information which are utilized in the encryption circuits 41, 42, . . . .

The main storage portion 110 is configured of the plural memories 111, 112, . . . which are the NAND flash memories. For example, each of the memories 111, 112, . . . is a semiconductor chip having a capacity of several tens [Mbytes]. The SSD 1 includes the plural memories (semiconductor chips) 111, 112, . . . , whereby a total capacity of several hundred [Mbytes] is realized.

In the SSD 1 according to this embodiment, the write operations or read operations of the encryption user data into or from the plural memories 111, 112, . . . are concurrently executed. Likewise, the encryptions or decryptions for the individual user data are concurrently executed. In the concurrently-executed encryptions and decryptions of the user data, the arbitrator 60 outputs the key information to be collectively stored in the key information storage portion 120, appropriately to the corresponding ones of the encryption circuits 41, 42, . . . . According to the SSD 1 including the above-described controller 100, the key information management processing in which the plural key information are collectively managed is executed. In other words, according to this embodiment, the key information for the encryptions and decryptions of the information can be stored more efficiently.

Figure 2:
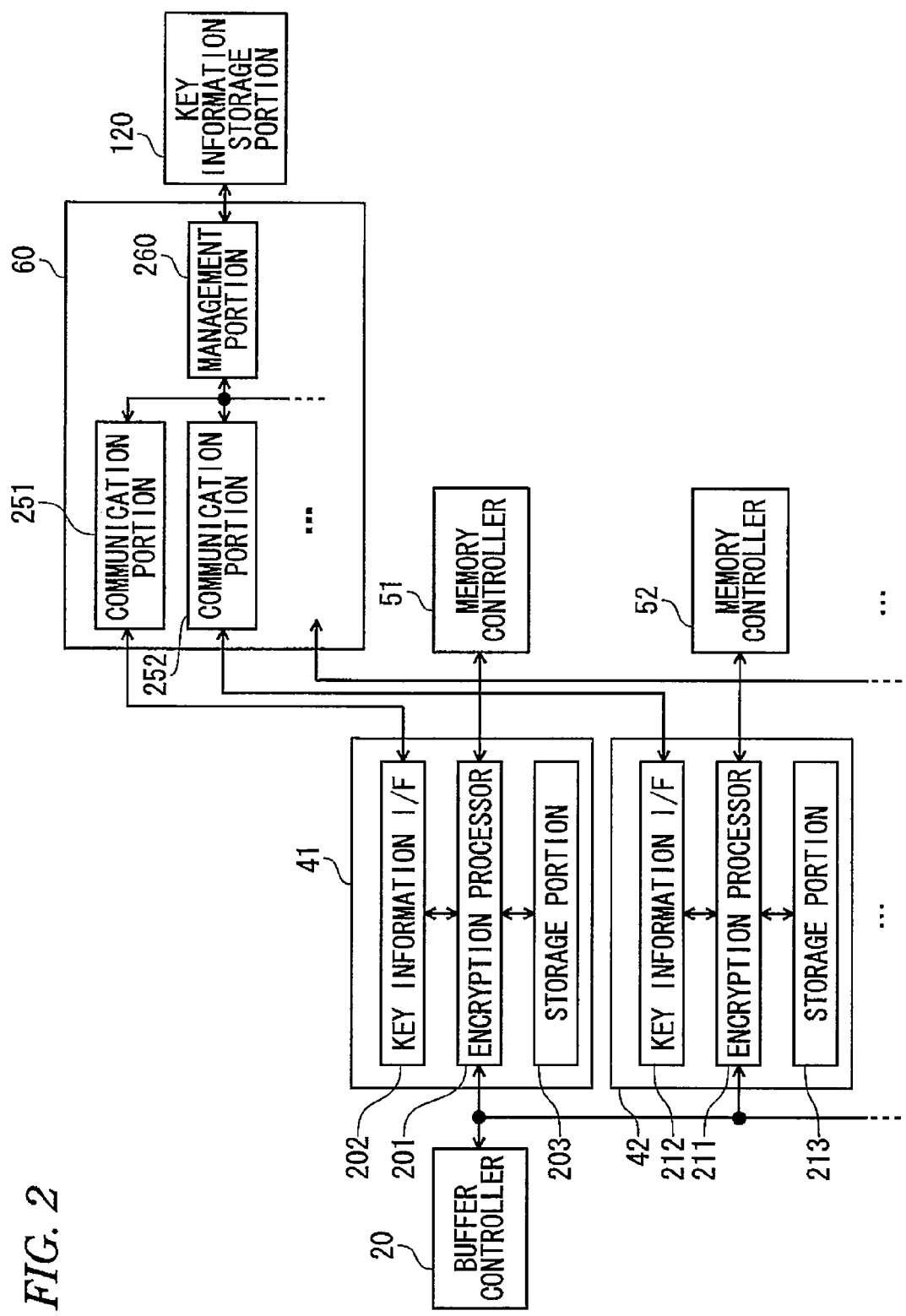
FIG. 2 illustrates an example system architecture which consists of plural blocks that execute key information management processing for collectively managing plural key information.

Next, the plural blocks which are included in the controller 100 explained with reference to FIG. 1 and which execute the key information management processing for collectively managing the plural key information will be described with reference to FIG. 2. FIG. 2 illustrates an example system architecture which consists of plural blocks that execute the key information management processing for collectively managing the plural key information.

The encryption circuit 41 includes an encryption processor 201, a key information I/F 202, and a storage portion 203. Likewise, the encryption circuit 42 includes an encryption processor 211, a key information I/F 212, and a storage portion 213. The arbitrator 60 includes communication portions 251, 252, . . . , and a management portion 260.

The encryption processor 201 encrypts user data inputted from the buffer controller 20, and it outputs the encrypted user data to the memory controller 51. Besides, the encryption processor 201 decrypts encrypted user data inputted from the memory controller 51, and it outputs the decrypted user data to the buffer controller 20. In case of encrypting or decrypting the user data, the encryption processor 201 reads out information on key information necessary for the encryption or decryption, from the storage portion 203. The information on the key information is an ID which indicates the key information uniquely, or that LBA (positional information) of the key information storage portion 120 at which the key information is stored. The information content of the ID or the LBA is several [bytes]. The encryption processor 201 notifies a request for acquiring the key information, to the key information I/F 202 together with the read-out ID or LBA. This encryption processor 201 generates an encryption key for use in the encryption and decryption of the user data, on the basis of the key information inputted from the key information I/F 202. Besides, in a case where the information on the key information is notified from the MPU 30, the encryption processor 201 stores the notified information in the storage portion 203.

The key information I/F 202 is a block which takes charge of the communications between the encryption circuit 41 and the arbitrator 60. The key information I/F 202 outputs the acquisition request for the key information and the ID or LBA of the key information notified from the encryption processor 201, to the communication portion 251 disposed in the arbitrator 60, as the information on the key information. Besides, the key information I/F 202 outputs the key information inputted as a response from the communication portion 251, to the encryption processor 201.

The storage portion 203 stores the ID which indicates the key information uniquely, or that LBA of the key information storage portion 120 at which the key information is stored, as the information on the key information necessary for the generation of the encryption key in the encryption processor 201. The storage portion 203 has the stored ID or LAB read out by the encryption processor 201. Besides, the storage portion 203 may store key length information which indicates the information content (bit length) of the key information.

The encryption processors 211, . . . execute operations similar to those of the encryption processor 201, but they differ in the point that the corresponding blocks are substituted from the memory controller 51 to the memory controllers 52, . . . , from the key information I/F 202 to the key information I/Fs 212, . . . , and from the storage portion 203 to the storage portions 213, . . . .

The key information I/Fs 212, . . . execute operations similar to those of the key information I/F 202, but they differ in the point that the corresponding blocks are substituted from the encryption processor 201 to the encryption processors 211, . . . .

The storage portions 213, . . . execute operations similar to those of the storage portion 203, but they differ in the point that the corresponding blocks are substituted from the encryption processor 201 to the encryption processors 211, . . . .

The communication portions 251, 252, . . . output the IDs or LBAs being the information on the key information as have been inputted from the key information I/Fs 202, 212, . . . , to the management portion 260 with the input sources managed. These communication portions 251, 252, . . . output the key information inputted as the responses from the management portion 260, to the managing input sources. Besides, the communication portions 251, 252, . . . are in one-to-one correspondence with the key information I/Fs 202, 212, . . . .

The management portion 260 reads out the key information corresponding to the IDs or LBAs inputted from the communication portions 251, 252, . . . , from the key information storage portion 120, and it outputs the read-out key information to the communication portions 251, 252, . . . . Besides, in a case where the management portion 260 is newly notified of key information from the MPU 20, it stores the notified key information in the information storage portion 120, and it newly manages the notified key information together with the information on the pertinent key information.

In this way, the IDs or LBAs being the information on the key information are outputted from the encryption circuits 41, 42, . . . to the arbitrator 60. The arbitrator 60 outputs the key information to the encryption circuits 41, 42, . . . of the output sources as responses based on the inputted IDs or LBAs. Incidentally, not only the IDs or LBAs being the information on the key information, but also key length information may be outputted from the encryption circuits 41, 42, . . . to the arbitrator 60. That is, the key information management processing in which the plural key information are collectively managed is executed chiefly by the encryption circuits 41, 42, . . . and the arbitrator 60. According to the SSD 1 including the above-described controller 100, the key information for the encryptions and decryptions of the information can be stored more efficiently.

Incidentally, the encryption circuits 41, 42, . . . , the arbitrator 60, and the key information storage portion 120 should preferably be encapsulated within a single semiconductor package. The secrecy of the key information is enhanced owing to the encapsulation of these blocks within the single semiconductor package.

Besides, the encryption circuits 41, 42, . . . do not individually store the key information which are respectively utilized, but the arbitrator 60 collectively stores the key information which are utilized in all the encryption circuits 41, 42, . . . , in the key information storage portion 120, thereby realizing the unitary management of the key information. In a case, for example, where the key information to be utilized in the encryption circuits 41, 42, . . . are common, one information suffices as the key information which is stored in the key information storage portion 120. In the related art, the same key information are stored in the encryption circuits 41, 42, . . . , respectively and individually. On the other hand, according to the SSD 1 including the above-described controller 100, the capacity of the key information to be stored can be sharply decreased.

Further, the communication portions 251, 252, . . . and the management portion 260 which are included in the arbitrator 60 are configured by hardware, whereby the key information can be outputted as in DMA operations in DRAM accesses. That is, it is permitted to easily heighten the speed of operations in which appropriate key information are outputted to the encryption circuits 41, 42, . . . of the output sources in accordance with the IDs or LBAs being the information on the key information as have been outputted from the encryption circuits 41, 42, . . . to the arbitrator 60.

Next, the key information which is managed by the management portion 260 included in the arbitrator 60 will be described with reference to FIG. 3. FIG. 3 illustrates examples of the key information which is managed by the management portion 260.

As shown in FIG. 3, the key information is divided into plural pieces (for example, four pieces), and key addresses are associated with the respective key information. Besides, the key addresses are managed in association with key IDs, or the stored addresses (LBAs) of the key information storage portion 120. For example, the key information for use in each of the encryption circuits 41, 42, . . . is of 128 [bits], 192 [bits], or 256 [bits]. In the case where the maximum bit length of the key information is 256 [bits] and where the key information is managed in four divisions, the minimum management unit becomes 64 [bits]. Assuming that the key information for use in the specified encryption circuit (for example, the encryption circuit 41) is of 128 [bits], a component corresponding to two minimum management units becomes necessary key information. Incidentally, the management portion 260 may manage the key length information of every key ID (or LBA).

The same key information are sometimes used in the respective encryption circuits 41, 42, . . . . In this case, one information suffices as the key information which is stored in the key information storage portion 120, and the plural key information for use in the respective encryption circuits 41, 42, . . . need not be stored. That is, in this case, the capacity of the key information to be stored can be made small. Besides, in the case where the key information is of 128 [bits], the component corresponding to the two minimum management units may be stored in the key information storage portion 120, and the capacity of the key information to be stored can be made still smaller.

Besides, the key information which are utilized in the respective encryption circuits 41, 42, . . . are sometimes constituted by the combinations of the key information of the minimum management unit. Let's suppose, for example, a case where the key information for use in the encryption circuit 41 has the key address "0" of the key ID=0 constituted by high-order information and the key address "1" of the key ID=0 constituted by low-order information. On this occasion, if the key information for use in the encryption circuit 42 has the key address "1" of the key ID=0 constituted by the high-order information and the key address "0" of the key ID=0 constituted by the low-order information, the different key information are used in the encryption circuits 41 and 42, but the key information of both the encryption circuits 41 and 42 are stored by storing the high-order information and low-order information of the key information.

In this manner, the key information is divided, and the key addresses are further associated with the divided key information, whereby the possibility of decreasing the key information to be stored becomes higher.

Next, the operation of the key information management processing which is executed chiefly by the encryption circuits 41, 42, . . . and the arbitrator 60 will be described with reference to FIG. 4. FIG. 4 illustrates a timing chart in the key information management processing.

The timing chart shown in FIG. 4 exemplifies a case where the encryption circuit 41 makes a request for the key address [0:4] of the key ID=0, while the encryption circuit 42 makes a request for the key address [0:4] of the key ID=1.

(a) The key information I/F 202 of the encryption circuit 41 outputs information which indicates the key ID=0 corresponding to desired key information, to the communication portion 251 of the arbitrator 60. On this occasion, also information which indicates the key address [0:4] at the key ID=0 may be outputted together.

(b) The key information I/F 212 of the encryption circuit 42 outputs information which indicates the key ID=1 corresponding to desired key information, to the communication portion 252 of the arbitrator 60. On this occasion, also information which indicates the key address [0:4] at the key ID=1 may be outputted together.

(c) The management portion 260 of the arbitrator 60 stacks a process for reading out from the key information storage portion 120, the key information which corresponds to the key address [0:4] of the key ID=0 inputted from the communication portion 251, and a process for reading out from the key information storage portion 120, the key information which corresponds to the key address [0:4] of the key ID=1 inputted from the communication portion 252.

(d) The management portion 260 instructs the key information storage portion 120 to perform the read-out of the key information stored at the LBA corresponding to the key address [0:4] of the key ID=0 as has been stacked as the first process.

(e) The key information storage portion 120 outputs the key information which is stored at the LBA corresponding to the key address [0:4] of the key ID=0, to the management portion 260.

(f) The management portion 260 outputs the key information read out, to the communication portion 251, and the communication portion 251 outputs the key information corresponding to the key address [0:4] of the key ID=0, to the key information I/F 202 every minimum management unit. When the output of all the key information is completed, the read-out process of the key information concerning the key address [0:4] of the key ID=0 as has been stacked as the first process is completed.

(g) When the read-out process of the key information concerning the key address [0:4] of the key ID=0 is completed, the management portion 260 instructs the key information storage portion 120 to perform the read-out of the key information stored at the LBA corresponding to the key address [0:4] of the key ID=1 inputted from the communication portion 252 as has been stacked as the next process.

(h) The key information storage portion 120 outputs the key information stored at the LBA corresponding to the key address [0:4] of the key ID=1, to the management portion 260.

(i) The management portion 260 outputs the key information read out, to the communication portion 252, and the communication portion 252 outputs the key information corresponding to the key address [0:4] of the key ID=1, to the key information I/F 212 every minimum management unit. When the output of all the key information is completed, the read-out process of the key information concerning the key address [0:4] of the key ID=1 as has been stacked as the next process is completed.

In this way, the key information management processing based on the encryption circuits 41 and 42 and the arbitrator 60 is executed at the timings indicated by (a)-(i). More specifically, concurrent requests can be made for the outputs of the key information from the encryption circuits 41 and 42 to the arbitrator 60. Besides, regarding the operations of reading out the key information from the key information storage portion 120 by the management portion 260, after the read-out of the previous key information is completed, the read-out of the succeeding key information is continuously executed. Accordingly, it is permitted to execute the key information management processing in which a time period from the request for the output of the key information, to the output of the key information is shortened to the utmost.

According to this embodiment, in the concurrently-executed encryption and decryption of the user data, the key information which are collectively stored in the key information storage portion 120 are appropriately outputted to the corresponding ones of the encryption circuits 41, 42, . . . by the arbitrator 60. In other words, the key information management processing for collectively managing the plural information is executed by the encryption circuits 41, 42, . . . and the arbitrator 60. In the key information management processing, requests for the outputs of the key information are concurrently made to the arbitrator 60, and regarding the operations of reading out the key information from the key information storage portion 120, after the read-out of the previous key information is completed, the read-out of the succeeding key information is continuously executed. Accordingly, it is permitted to execute the key information management processing in which the time period from the request for the output of the key information, to the output of the key information is shortened to the utmost. Thus, according to the SSD 1 including the above-described controller 100, the key information for the encryption and decryption of the information can be stored more efficiently.

The present invention is not limited to the above embodiment, but various alterations, modifications, etc. can be made within a scope of the present invention. Besides, various inventions can be formed by appropriately combining plural components disclosed in the foregoing embodiments. For example, some components may be omitted from all the components indicated in the embodiments, and the components according to the different embodiments may be appropriately combined.

The invention claimed is:

1. An information storage apparatus, comprising:
a plurality of nonvolatile memories configured to store encryption information so that the stored encryption information are read out therefrom;
a plurality of encryption processing modules provided correspondingly with the respective memories, and configured to encrypt the information to be stored in the memories and to decrypt the encryption information read out from the memories;
a key information storage module configured to collectively store a plurality of key information that are utilized when the encryption processing modules encrypt the information to be stored or decrypt the encryption information read out; and
a key information processor connected to the key information storage module and comprising a plurality of communication modules configured to communicate with the encryption processing modules,
wherein the encryption processing modules and the communication modules are in one-to-one correspondence, and the encryption processing modules and the communication modules are encapsulated within a single semiconductor package.

2. The apparatus of claim 1, wherein the encryption processing modules are configured to notify the key information storage module of IDs which uniquely indicate the key information, or a plurality of positional information in a storage medium at which the key information are stored.

3. The apparatus of claim 1, wherein the plurality of key information includes at least a first part of a key and a second part of a key, and a composite key that includes the first and second parts is utilized by one of the encryption processing modules.

4. The apparatus of claim 3, wherein a different composite key that includes the first and second parts is utilized by a different one of the encryption processing modules.

5. An information storage method to be executed in an information storage apparatus comprising a plurality of nonvolatile memories configured to store information, the method comprising:
storing encryption information in the memories, and reading out the encryption information stored in the memories;
respectively encrypting by a plurality of encryption processing modules information to be stored in the memories, and respectively decrypting the encryption information read out from the memories; and
collectively storing in a key information storage module, a plurality of key information which are utilized when encrypting the information to be stored in the memories or decrypting the encryption information read out therefrom,
wherein the information storage apparatus further comprises a key information processor that is connected to the key information storage module and includes a plurality of communication modules configured to communicate with the encryption processing modules, and
wherein the encryption processing modules and the communication modules are in one-to-one correspondence and the encryption processing modules and the communication modules are encapsulated within a single semiconductor package.

6. The method of claim 5, wherein the step of encrypting notifies IDs which uniquely indicate the key information, or a plurality of positional information in a storage medium at which the key information are stored, which are to be used in the step of storing.

7. An electronic device, comprising:
a host apparatus configured to transmit information;
a plurality of nonvolatile memories configured to store encryption information obtained by encrypting the information transmitted from the host apparatus so that the stored encryption information are read out therefrom;
a plurality of encryption processing modules provided correspondingly with the respective memories, and configured to encrypt the information to be stored in the memories and to decrypt the encryption information read out from the memories;
a key information storage module configured to collectively store a plurality of key information which are utilized when the encryption processing modules encrypt the information to be stored or decrypt the encryption information read out; and
a key information processor that is connected to the key information storage module and includes a plurality of communication modules configured to communicate with the encryption processing modules,
wherein the encryption processing modules and the communication modules are in one-to-one correspondence and the encryption processing modules and the communication modules are encapsulated within a single semiconductor package.

8. The device of claim 7, wherein the encryption processing modules notify the storage processing module of IDs which uniquely indicate the key information, or a plurality of positional information in a storage medium at which the key information are stored.

* * * * *